Patented Apr. 25, 1933

1,905,286

UNITED STATES PATENT OFFICE

RICHARD HERZ, OF FRANKFORT-ON-THE-MAIN, AND WERNER ZERWECK, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

PROCESS FOR CHLORINATING ANTHANTHRONE

No Drawing. Original application filed November 1, 1926, Serial No. 145,697, and in Germany November 7, 1925. Divided and this application filed December 11, 1929. Serial No. 413,419.

This application is a division of our copending application Serial No. 145,697, filed November 1, 1926.

We have found that valuable vat dyestuffs of the anthanthrone series are obtainable by causing a chlorinating agent to act upon anthanthrone in the presence of an inorganic diluent selected from the group consisting of: concentrated sulfuric acid, sulfuric acid monohydrate, fuming sulfuric acid, chlorosulfonic acid, sulfuryl chloride, sulfur chlorides and thionyl chloride.

As suitable chlorinating agents there may be used: chlorine gas and those compounds which evolve chlorine during the reaction as, for instance, sulfuryl chloride, antimony pentachloride, sulfur chlorides, alkali hypochlorites in the presence of an inorganic acid and alkali chlorates in the presence of hydrochloric acid.

According to our new process, one or more chlorine atoms may be introduced into the anthanthrone molecule by passing, while stirring, for instance, chlorine into finely ground anthanthrone in the presence of an inorganic diluent as before stated, to which a small amount of iodine, ferric chloride, antimony pentachloride, iodine-trichloride or a similar compound may be added as a chlorine carrier.

The most valuable products are obtained when the chlorination is carried out in such a way that approximately two atoms of chlorine enter into the molecule of the anthanthrone.

The new dyestuff, thus obtained, having probably the formula:

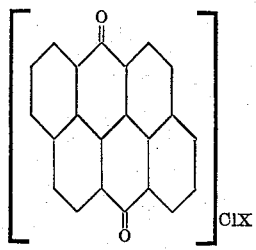

in which formula X is approximately the number 2, is when dry an orange-red powder, soluble in concentrated sulfuric acid with a pure green color. It dyes vegetable fibers from a violet vat violet shades, turning to a brilliant yellowish-orange of excellent fastness when exposing the dyed goods to the air or soaping it.

In order to further illustrate our invention, the following example is given, the parts being by weight and all temperatures in centigrade degrees, but it is understood that our invention is not limited to the particular products or reaction condition mentioned therein:

Example 15 parts of anthanthrone are dissolved in about 200 parts of chlorosulfonic acid at room temperature. The mass is cooled, 0.2 parts of iodine are added and 16 to 20 parts of chlorine are allowed to pass in until the increase of the weight shows that two atoms of chlorine have entered into the molecule. The temperature during the reaction should preferably not rise above 15°. After standing for some hours the mass is poured on ice; the separated dyestuff is filtered and dried. The new dyestuff, thus obtained, having probably the formula:

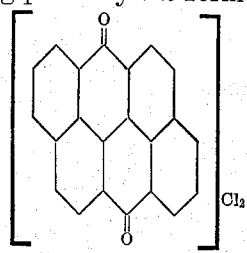
(approximately)

is when dry an orange-red powder, soluble in concentrated sulfuric acid with a pure green color. It dyes vegetable fibers from a violet vat violet shades, turning to a brilliant yellowish-orange of excellent fastness when exposing the dyed goods to the air or soaping it.

We claim:

The process which comprises reacting at room temperature upon 15 parts of anthanthrone with 16 to 20 parts of chlorine in the presence of 200 parts of chlorosulfonic acid and 0.2 parts of iodine.

In testimony whereof we affix our signatures.

RICHARD HERZ.
WERNER ZERWECK.